United States Patent Office 3,458,431
Patented July 29, 1969

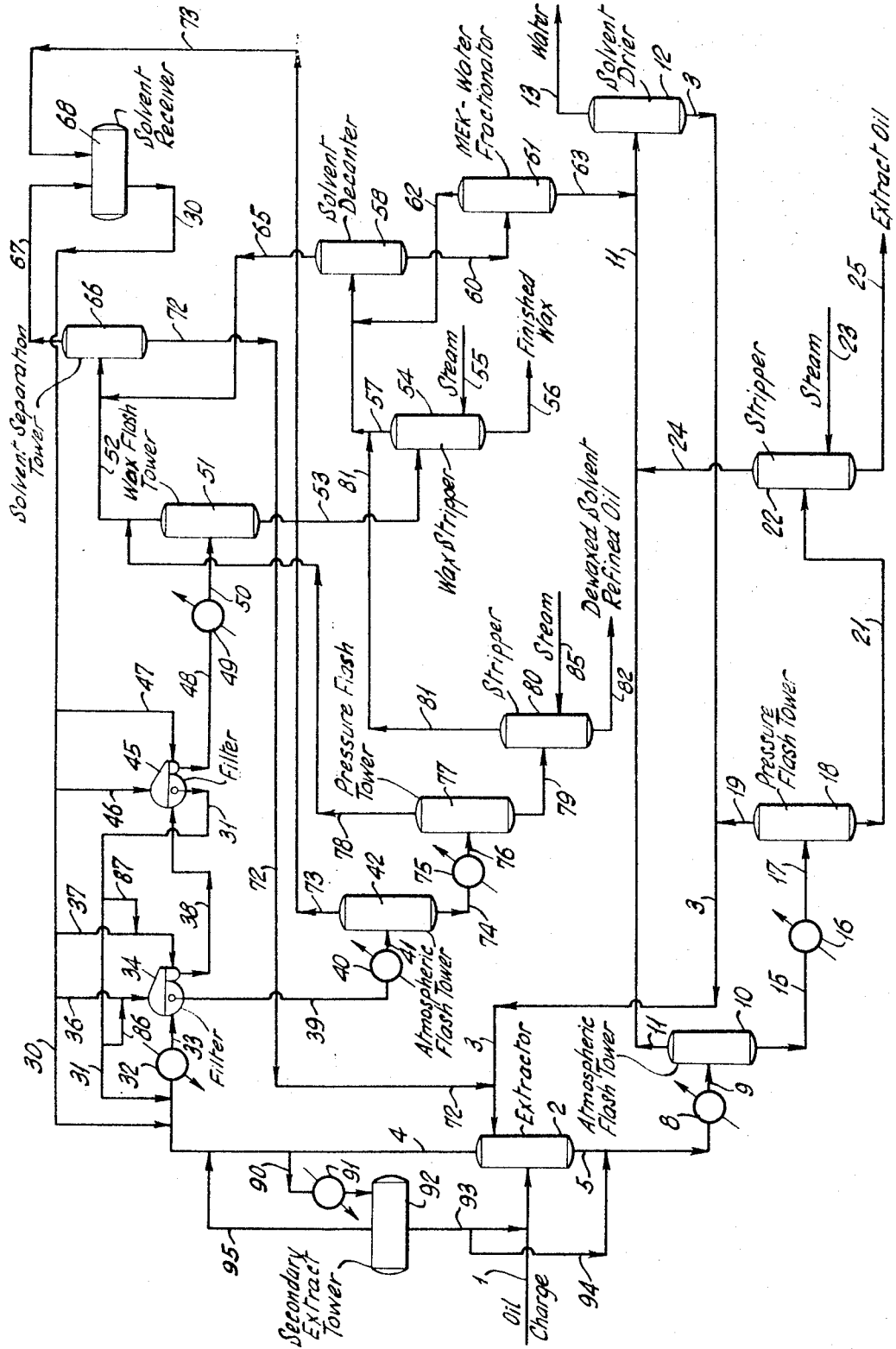

3,458,431
MINERAL OIL SOLVENT DEWAXING
John I. Nixon, deceased, late of Bridge City, Tex., by Roberta Lois Nixon, administratrix, Bridge City, Tex., assignor to Texaco Development Corporation, New York, N.Y., a corporation of Delaware
Filed Sept. 7, 1967, Ser. No. 666,141
Int. Cl. C10g 43/18, 43/06, 21/20
U.S. Cl. 208—33  11 Claims

ABSTRACT OF THE DISCLOSURE

Separation of wax and constituents of low viscosity index, low thermal stability, and poor oxidation stability from petroleum fractions by liquid-liquid extraction and solvent dewaxing. A petroleum fraction is extracted with a solvent comprising a pyrrolidone. Raffinate oil is dewaxed by cooling in the presence of a solvent mixture comprising a pyrrolidone, an aromatic hydrocarbon, and a ketone effecting precipitation of wax. Precipitated wax is filtered from refined dewaxed petroleum fraction.

BACKGROUND OF THE INVENTION

Field of the invention

In the manufacture of lubricating oils from crude petroleum hydrocarbons, one or more fractions containing the lubricating constituents are separated by distillation, usually by vacuum distillation. The raw lubricating oil fractions contain wax which causes the oil to have a high cloud point and pour test and unstable naturally occurring materials which tend to form deposits or become corrosive in operating equipment as a result of heating and oxidation or both. Additionally, in the case of paraffinic lubricating oils, it is often desirable to increase the viscosity index by removing the more aromatic lower viscosity index constituents from the oil. To accomplish this, it is necessary to remove or destroy a significant amount of material present in the raw stock, typically ranging from 10 to 60 percent depending on the qualities desired in the product oil. The most common way to do this is by extraction with a solvent having selectivity for the more unstable molecules which are predominantly aromatic and non-hydrocarbon materials. Prior to the advent of solvent extraction, severe treatment with concentrated sulfuric acid was commonly used to destroy these undesirable materials.

In the treatment of oils to remove unstable, corrosive, low viscosity index constituents of oil, a substantial amount of material is removed from the charge stock, that is, an amount in excess of about 10 volume percent. This is distinctly different from decolorizing treatment in lubricating oil manufacture where only trace amounts of coloring material are removed, typically less than 1.0 percent. Here, handling losses are usually greater than the amount of material removed. Common methods used for color improvement are, for example, clay treating, mild acid treating and hy-finishing (mild hydrogenation). Such color improvement steps are often used after solvent refining. A raw stock that is treated only for color improvement is usually unsatisfactory as regards thermal and oxidation stability or viscosity index. Lubricating oil stocks are also frequently treated to remove wax or waxy materials to reduce the cloud or pour test. A common method of separating wax and waxy materials from hydrocarbon oil is by solvent dewaxing in which the waxy material is crystallized from solvent diluted mixtures at reduced temperatures. The solvent dilutes the supernatant liquid and reduces its viscosity so that more complete and rapid separation of the supernatant liquid from the crystallized wax may be effected. Crystallization in the presence of a solvent also fosters crystal growth in a form easily filtered. Solvents commonly used in solvent dewaxing include ketones, for example, acetone, methylethylketone, methylnormal propylketone, methylisopropylketone, methylisobutylketone and their mixtures. Advantageously, the ketone solvent is modified by the addition of an aromatic hydrocarbon, for example, benzene or toluene. Cooling is advantageously effected in scraped wall exchangers to maintain high heat transfer rates and prevent plugging. Separation of the wax is desirably effected with drum type vacuum filters.

Description of the prior art

Heretofore pyrrolidones have been known as solvents for the separation of olefins, diolefins, and aromatic hydrocarbons. It has also been known that pyrrolidones may be used to treat oil for the improvement of color. However, it has not been known that pyrrolidones are effective solvents in the solvent dewaxing of hydrocarbon oils or that raffinate from the solvent refining of oil with a pyrrolidone and containing dissolved pyrrolidone may be subjected to solvent dewaxing with improved results.

SUMMARY OF THE INVENTION

In accordance with this invention, a waxy petroleum fraction is diluted with a solvent mixture comprising a pyrrolidone, a ketone, and an aromatic hydrocarbon. The resulting mixture is cooled to a temperature at which at least a portion of the waxy constituents is precipitated and the precipitated wax is filtered from a dewaxed oil-solvent mixture. Advantageously the pyrrolidone employed is N-methyl-2-pyrrolidone, hereinafter referred to as NMP, the ketone employed is methylethylketone and the aromatic hydrocarbon is toluene. A dewaxing temperature within the range of about 20 to −40° F. is employed. The solvent mixture suitably comprises within the range of about 2 to 20 volume percent pyrrolidone, within the range of about 20 to 75 volume percent ketone, and within the range of about 20 to 75 volume percent aromatic hydrocarbon.

In accordance with one embodiment of this invention, a petroleum fraction containing constituents of low viscosity index, poor thermal stability, poor oxidation stability, and wax is treated for the removal of the constituents of low viscosity index and poor thermal and oxidation stability by solvent extraction with a pyrrolidone at a temperature of at least 50° F. and below the temperature of complete miscibility of said petroleum fraction in said solvent. The resulting raffinate-mix comprising wax containing oil with a minor amount of said solvent dissolved therein is diluted with a solvent comprising a ketone and an aromatic hydrocarbon and the diluted raffinate-mix is cooled to a temperature at which the wax is precipitated. Precipitated wax is then filtered from refined dewaxed petroleum fraction. In the solvent refining step, the petroleum fraction is contacted with the solvent at a dosage within the range of about 50 to 450 percent of said petroleum fraction and at a temperature within the range of about 50 to 250° F. When treating paraffin based fractions, advantageously the solvent dosage is maintained within the range of about 100 to 340 volume percent and the contacting temperature is maintained within the range of about 140 to 180° F. When treating naphthene base petroleum stocks, the solvent dosage is maintained within the range of about 75 to 200 volume percent and the contacting temperature within the range of about 75 to 150° F.

The inclusion of a pyrrolidone, for example NMP, in the solvent mixture employed in solvent dewaxing significantly increases the filtering rates at no loss in dewaxed oil yield or pour point. Advantageously, when solvent refining a lubricating oil stock with a pyrrolidone, the raffinate-mix containing dissolved pyrrolidone may be charged directly to solvent dewaxing without separation of dissolved solvent. In this case it is unnecessary to provide facilities for the stripping of solvent from the raffinate-mix as part of the solvent refining operation. Accordingly, this combination provides an improvement in both the solvent refining and solvent dewaxing processes. The solvent refining operation is improved since the refined oily recovery system is eliminated. The solvent dewaxing operation is improved since the dewaxed oil filtration rates are significantly increased with resulting increase in thruput in the solvent dewaxing process. The presence of a pyrrolidone apparently modifies the wax crystal structure to the extent that higher filter rates are obtained.

As the viscosity of petroleum fractions increase, the crystalline structure of separated wax becomes smaller and more dense. These waxes, called micorcrystalline waxes, are characterized by low filtration rates and high dewaxed oil yields. The presence of a pyrrolidone in the solvent mixture in dewaxing these oils is particularly desirable in increasing filter cycles rates. Any loss in yield in the primary filter operation resulting from higher oil occlusion at high filter rates is recovered by repulping the slack wax from the primary filter operation.

In dewaxing solvent refined raffinate-mix fractions, it is preferred to pass the raffinate-mix directly to the dewaxing operation without any intermediate separation or storage. However, in the event that it is desired to reduce the pyrrolidone content of the raffinate-mix, a portion of the pyrrolidone may be separated by cooling the raffinate-mix from solvent refining temperature to a temperature intermediate to the solvent refining and the dewaxing temperatures. This cooling step causes separation of a secondary extract which is predominantly solvent thereby substantially reducing the solvent content of the raffinate-mix. In this case, the secondary extract phase is preferably recycled with the feed to the solvent extractor or it may be included in the primary extract-mix phase.

An advantage of the combined solvent refining and dewaxing process of this invention is that the raffinate-mix solvent separating system is eliminated thereby saving investment and operating costs. The raffinate-mix containing pyrrolidone significantly increases filter cycle rates at no expense to dewaxed oil solid points and with no reduction in dewaxed oil yield when employing primary dewaxing followed by repulping. A further advantage of this invention is that the pyrrolidone content of the raffinate-mix passed to the dewaxing operation may be readily controlled by cooling the solvent-oil mixture to a temperature at which the desired amount of pyrrolidone is soluble in the raffinate oil and remaining pyrrolidone is separated as a secondary extract. Furthermore, separation of a secondary extract effects an incremental improvement in the quality of the refined oil.

BRIEF DESCRIPTION OF THE DRAWINGS

The accompanying flow diagram is illustrative of the process of this invention. Although the flow diagram illustrates a particular arrangement of apparatus and is described with reference to particular materials which may be used in the practice of this invention, it is not intended to limit the invention to the particular apparatus or materials described.

Oil charge, which may be for example a lubricating oil cut separated by vacuum distillation of crude oil, is passed through line 1 to extractor 2. Extractor 2 is a liquid contacting device suitable for solvent extraction. Extractors 2 may be a rotating disc contactor, a packed, spray, or sieve tray column, or a centrifugal contacting device such as a Podbielniak centrifugal contactor. In extractor 2, the oil charge is countercurrently contacted with a pyrrolidone solvent, for example NMP, introduced through line 3. NMP solvent may be employed for example at a solvent dosage of about 120 volume percent that is, 120 volumes of solvent per 100 volumes of charge oil, and at a contacting temperature of about 150° F. Raffinate-mix comprising constituents of the charge insoluble in the solvent (predominantly paraffinic in type) together with a small amount of dissolved solvent is discharged through line 4. The constitutents of the charge soluble in the solvent (predominantly aromatic in nature and the constiutents of poor stability) and the bulk of the solvent are discharged as extract-mix through line 5. Extract-mix line 5 is heated in heat exchanger 8 and the heated extract-mix is passed through line 9 to atmospheric flash tower 10. Although not shown, heat for exchanger 8 may be supplied by cooling another process stream, for example a distillate stream produced in solvent recovery operations. Atmospheric distillation tower 10 is desirably operated at a pressure within the range of about atmospheric to about 25 pounds per square inch gauge and preferably at about 20 pounds per square inch gauge. In distillation tower 10, about 40 percent of the solvent and any dissolved water in the heated extract-mix are vaporized and withdrawn as distillate through line 11. Wet distillate in line 11 is passed to solvent drying tower 12 which is withdrawn through line 13 and dry solvent which is withdrawn through line 3.

Extract-mix free of water and containing about 60 percent of the solvent present in the extract-mix withdrawn from extractor 2 is withdrawn from the bottom of tower 10 through line 15 and is heated in heating coil 16 to a temperature of about 538° F. Heating coil 16 may be a fired heater or may be supplied with heat from an outside source to achieve the desired temperature. Heated extract-mix in line 17 is then passed to pressure flash tower 18 at a pressure of about 25 to 100 pounds per square inch gauge and preferably at about 55 pounds per square inch gauge. About 95 weight percent of the solvent in the charge to tower 18 is distilled overhead and separated as dry solvent in line 19. The dry solvent in line 19 is combined with that in line 3 for recycle to extractor 2.

Bottoms from tower 18 containing all of the extract oil and the remainder of the solvent is passed through line 21 to stripping tower 22. In stripping tower 22, remaining solvent is distilled by contact with steam introduced through line 23 and separated as wet distillate in line 24. Complete separation of solvent is facilitated by the use of pressures within the range of about 5 pounds per square inch absolute up to atmospheric and preferably of about 11 pounds per square inch absolute. Resulting solvent-free extract is withdrawn through line 25. Overhead distillate comprising solvent and water is combined with the wet distillate in line 11 and charged to solvent dryer 12.

Raffinate-mix in line 4 is diluted with ketone-aromatic solvent mixture from lines 30 and 31, and the resulting mixture is cooled in chiller 32 to a temperature at which the waxy constituents are precipitated as crystalline solids. The resulting slurry of wax crystals in oil and solvent is passed through line 33 to filter 34. Filter 34 may be, for example, a vacuum drum filter in which the wax crystals are separated, washed with solvent from line 36 and discharged with dilution solvent from line 37 through line 38. Filtrate is withdrawn through line 39, heated in exchanger 40, and passed through line 41 to atmospheric flash tower 42.

Slurried wax in line 38 containing some occluded oil is passed to filter 45. In filter 45, the wax is separated from filtrate which is withdrawn through line 31 comprising principally solvent with the small amount of occluded oil washed from the wax product. The wax cake in filter 45 is washed with solvent introduced through line 46 and the separated wax is slurried with solvent from line 47 and passed through line 48 to heater 49. In heater 49, the wax-solvent mixture is heated to a temperature sufficient to flash substantially all of the solvent from the wax-solvent mixture and is passed through line 50 to wax flash tower 51. In wax flash tower 51, the solvent is separated as distillate through line 52 and molten wax, containing a small amount of solvent, is withdrawn as distillation bottoms through line 53. The molten wax is then passed to wax stripper 54 wherein remaining solvent is removed by contact with steam introduced through line 55. Finished molten wax is withdrawn from the bottom of stripper 54 through line 56 and discharged to storage or further processing not shown. Distillate from stripper 54 comprising solvent and steam is withdrawn from stripper 54 through line 57 and passed to solvent decanter 58.

In solvent decanter 58, a solvent phase comprising pyrrolidone, toluene and methylethylketone with a small amount of water dissolved therein separates from a water phase comprising principally water with a small amount of each of the solvents dissolved therein. Water phase is withdrawn through line 60 and passed to MEK-water fractionator 61 which is a fractional distillation tower operated to separate methylethylketone vapor as distillate from bottoms comprising water and the higher boiling solvents including toluene and the pyrrolidone. The MEK distillate is withdrawn through line 62 and combined with the stream in line 57 for return to solvent decanter 58. Water free of methylethylketone but containing pyrrolidone is withdrawn through line 63 and combined with the solvent stream in line 11 passed to solvent dryer 12.

Solvent phase from decanter 58 is withdrawn through line 65, combined with the stream in line 52 and passed to solvent separation tower 66. Solvent separation tower 66 is a distillation column operated to separte the dewaxing solvents MEK and aromatic hydrocarbon from the higher boiling pyrrolidone solvent. The dewaxing solvent is withdrawn for reuse in the dewaxing process through line 30. Pyrrolidone solvent is withdrawn from the bottom of distillation tower 66 through line 72 and combined with the solvent in line 3 passed to extractor 2.

In atmospheric flash tower 42, dry solvent is withdrawn as distillate through line 73 and passed to solvent receiver 68. Bottoms from atmospheric flash tower 42 are withdrawn through line 74, heated in heater 75, and the hot solvent-oil mixture passed through line 76 to pressure flash tower 77. In pressure flash tower 77, a major portion of the dewaxing solvent is separated as distillate through line 78 and is passed with the solvent stream in line 52 to solvent separator tower 66. Pressure flash tower bottoms, comprising the dewaxed solvent refined oil substantially free of solvent, is withdrawn from tower 77 through line 79 and passed to oil stripper 80. In oil stripper 80, remaining solvent is removed by stripping with steam introduced through line 85. The resulting distillate is passed through line 81 and combined with the wax stripper overhead in line 57 for transfer to solvent decanter 58. Dewaxed solvent refined oil product is withdrawn from the bottom of stripper 80 through line 82 and passed to storage or blending not shown.

Advantageously filtrate from filter 45 may be employed as a part of the washing solvent or flushing solvent by passing filtrate from line 31 to solvent line 36 through line 86 and to solvent line 37 through line 87 respectively.

The raffinate-mix in line 4 contains pyrrolidone in an amount determined by the solubility at the temperature of extractor 2. If it is desired to reduce the pyrrolidone content from this level, the raffinate-mix in line 4 is passed through line 90 and cooler 91 to secondary extract separator 92. Upon cooling the raffinate-mix, a portion of the solvent separates as a secondary extract which may be withdrawn through line 93 and returned to oil charge line 1. Alternatively, the secondary extract can be passed from line 93 through line 94 to extract-mix line 5. The oil phase separting in secondary extract separator 92 comprises solvent refined oil of reduced pyrrolidone content and is withdrawn from separator 92 through line 95 and returned to line 4.

Description of the preferred embodiments

In an example of the process of this invention, a vacuum distillate from crude distillation identified as a Wax Distillate 20 is solvent refined with NMP at a solvent dosage of 120 volume percent with an extraction temperature of 150° F. The resulting raffinate-mix containing 15 volume percent of NMP is separated into two portions one of which, designated Stock A, is charged directly to solvent dewaxing and the other of which, designated Stock B, is stripped to remove dissolved NMP and then subjected to solvent dewaxing. Each stock is dewaxed with a solvent comprising 52 percent methylethylketone and 48 percent toluene at a solvent dilution ratio of 2.5:1.0, employing a chilling range of 140 to −15° F. and with a dewaxing cake thickness of 0.25 inch. The results obtained with varying wash solvent ratios are tabulated in table following.

TABLE

| Charge stock | Stock B | | | | Stock A | | | |
|---|---|---|---|---|---|---|---|---|
| Conditions: | | | | | | | | |
| Wash solvent ratio | 0 | 0.31:1 | 0.97:1 | 1.81:1.0 | 0 | 0.35:1 | 0.86:1 | 1.66:1 |
| Cycle time, minutes | 1.00 | 1.00 | 1.68 | 3.36 | 0.48 | 0.48 | 0.48 | 2.68 |
| Cake forming time, seconds | 25 | 25 | 25 | 27 | 12 | 12 | 12 | 12 |
| Cycle rate, gal. WFO/hr.-sq. ft. | 4.63 | 10.31 | 3.32 | 2.13 | 10.43 | 26.15 | 11.75 | 3.29 |
| Dewaxed oil yield, vol. percent | 59.4 | 59.1 | 78.7 | 84.3 | 56.5 | 58.0 | 72.4 | 81.9 |
| Dewaxed oil tests: | | | | | | | | |
| Gravity, ° API | 31.1 | 31.1 | 31.2 | 31.1 | 31.1 | 31.0 | 31.0 | 31.0 |
| Solid point, ° F | 0 | 0 | 0 | −2 | −2 | +2 | 0 | 0 |
| Wax tests: | | | | | | | | |
| Oil content, wt. percent | 29.8 | 29.9 | | 11.9 | 26.9 | 26.5 | 24.6 | 23.1 |
| Congealing point, ° F | 127 | 127 | | 140 | 122 | 122 | 129 | 135 |

The data in above table show that dewaxed oil filter cycle rates are significantly improved when charging the raffinate-mix directly from solvent refining to the solvent dewaxing process. It will be noted that the improved results are obtained in all cases as a result of inclusion of the NMP in the dewaxing feed. This improvement is obtained at no expense in the dewaxed oil solid point. Although the dewaxed oil yields are slightly lower in the primary dewaxing opeartion when employing NMP as a diluent resulting in a softer wax having a higher oil content, the same overall yield and wax hardness is obtained by repulping and refiltering. As the wash solvent ratio increases, the filter cycle rate is significantly reduced and the dewaxed oil yield approaches a maximum. At 0.75:1.0 wash solvent ratio a cycle rate 130 percent higher is obtained with the refined oil containing 15 volume percent NMP in comparison with the refined oil without NMP. At 1.5:1.0 wash solvent ratio, the refined oil with 15 volume percent NMP achieves a 17 percent higher cycle rate than the refined oil without NMP.

What is claimed is:
1. A method of dewaxing a waxy petroleum fraction which comprises
diluting said waxy petroleum fraction with a solvent mixture comprising a pyrrolidone, a ketone and an aromatic hydrocarbon,
cooling the diluted mixture to a temperature at which at least a portion of the waxy constituents of said petroleum fraction is precipitated and, filtering precipitated wax from dewaxed oil-solvent mixture.

2. The method of claim 1 wherein said diluted mixture is cooled to a temperature within the range of about 20° F. to about —40° F.

3. The method of claim 1 wherein said pyrrolidone is N-methyl-2-pyrrolidone, said ketone is methylethylketone and said aromatic hydrocarbon is toluene.

4. The method of claim 1 wherein said solvent mixture comprises within the range of about 2 to 20 volume percent pyrrolidone, within the range of about 20 to 75 volume percent ketone and within the range of about 20 to 75 volume percent aromatic hydrocarbon.

5. A method of refining and dewaxing a petroleum fraction for the removal of wax and constituents having a low viscosity index, poor thermal stability and poor oxidation stability, which comprises contacting said petroleum fraction with a solvent comprising a pyrrolidone at an extraction temperature of at least 50° F. and below the temperature of complete miscibility of said petroleum fraction in said solvent forming a raffinate-mix comprising a wax containing oil with a minor amount of said solvent dissolved therein and an extract-mix comprising said solvent with said constituents having a low viscosity index, poor thermal stability and poor oxidation stability dissolved therein, diluting at least a portion of said raffinate-mix with a solvent mixture comprising a ketone and an aromatic hydrocarbon, cooling diluted raffinate-mix to a dewaxing temperature at which at least a portion of the wax contained therein is precipitated, and filtering precipitated wax from refined dewaxed petroleum fraction.

6. The method of claim 5 wherein said pyrrolidone is N-methyl-2-pyrrolidone, said ketone is methylethylketone and said aromatic hydrocarbon is toluene.

7. The method of claim 5 wherein said petroleum fraction is contacted with said solvent at a solvent dosage within the range of about 50 to 450 percent of said petroleum fraction.

8. The method of claim 5 wherein said petroleum fraction is contacted with said solvent at a temperature within the range of about 50 to 250° F.

9. The method of claim 5 wherein said petroleum fraction is paraffin based, the solvent dosage is within the range of 100 to 340 volume percent, and the contacting temperature is within the range of about 140 to 180° F.

10. The method of claim 5 wherein said petroleum fraction is naphthene based, the solvent dosage is within the range of about 75 the 200 volume percent, and the contacting temperature is within the range of about 75 to 150° F.

11. The method of claim 5 wherein said raffinate-mix is cooled to a temperature intermediate said extraction temperature and said dewaxing temperature effecting separation of a secondary extract-mix from remaining raffinate-mix of reduced solvent content.

References Cited

UNITED STATES PATENTS

| | | | |
|---|---|---|---|
| 2,771,494 | 11/1956 | Weedman | 208—326 |
| 2,933,448 | 4/1960 | Morin et al. | 208—326 |
| 3,244,614 | 4/1966 | Summers | 208—36 |
| 3,318,800 | 5/1967 | Ringler | 208—36 |
| 3,403,092 | 9/1968 | Rausch | 208—36 |
| 2,092,739 | 9/1937 | Van Dijk | 208—326 |
| 2,761,814 | 9/1956 | Post | 208—36 |
| 2,767,119 | 10/1956 | Forchielli | 208—289 |

HERBERT LEVINE, Primary Examiner

U.S. Cl. X.R.

208—36, 326

PO-1050
(5/69)

UNITED STATES PATENT OFFICE
CERTIFICATE OF CORRECTION

Patent No. 3,458,431　　　　　　　　Dated July 29, 1969

Inventor(s) John I. Nixon

It is certified that error appears in the above-identified patent and that said Letters Patent are hereby corrected as shown below:

Column 1, line 5, "Texaco Development Corporation"

should read --Texaco Inc.--.

SIGNED AND
SEALED
OCT 20 1970

(SEAL)
Attest:

Edward M. Fletcher, Jr.
Attesting Officer

WILLIAM E. SCHUYLER, JR.
Commissioner of Patents